March 17, 1931. W. LEGGEMANN ET AL 1,796,605
DEVICE FOR THE RADIAL ADJUSTING OF BRAKE BLOCKS ON RAILWAY VEHICLES
Filed Aug. 17, 1929 2 Sheets-Sheet 2
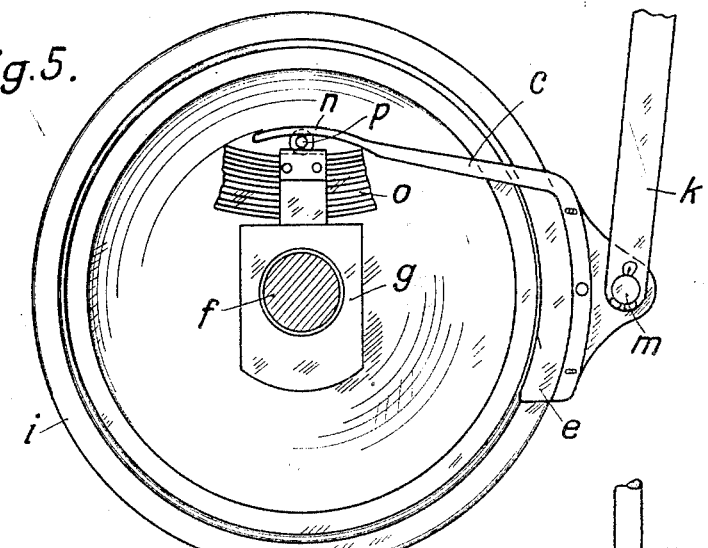
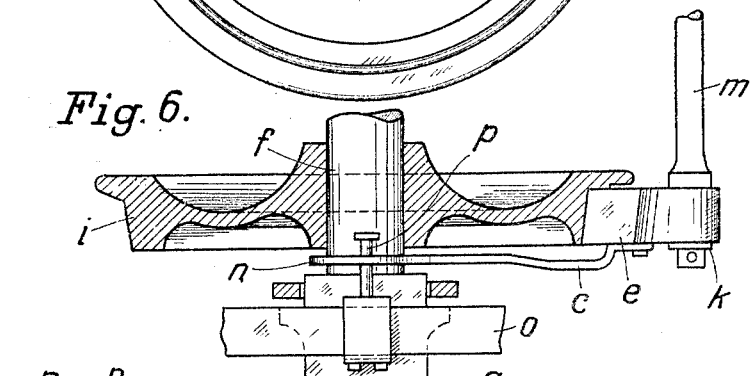
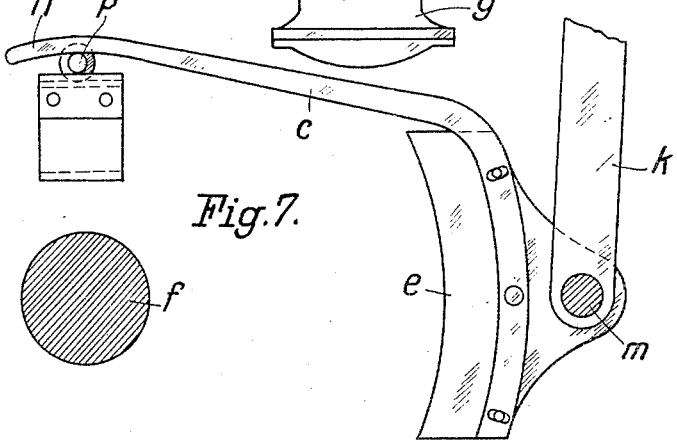
Inventors
Wilhelm Leggemann
Wilhelm Müller Patented Mar. 17, 1931

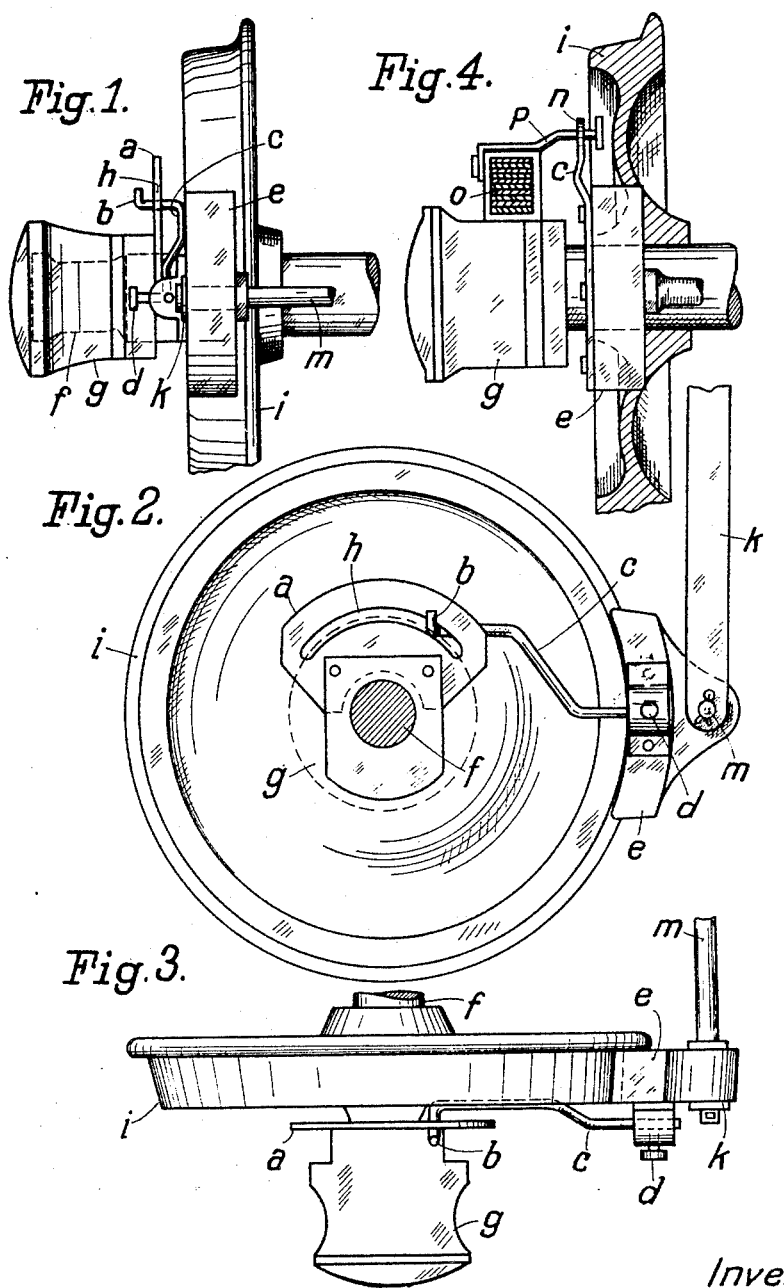

1,796,605

UNITED STATES PATENT OFFICE

WILHELM LEGGEMANN AND WILHELM MÜLLER, OF OBERHAUSEN, GERMANY

DEVICE FOR THE RADIAL ADJUSTING OF BRAKE BLOCKS ON RAILWAY VEHICLES

Application filed August 17, 1929, Serial No. 386,722, and in Germany August 20, 1928.

This invention relates to a device which permanently adjusts radially the brake blocks of vehicles running on rails. The well known inconveniences of the brake blocks not radially adjustable, owing to the arrangement of so-called pressing off springs, are thus obviated.

It has already been proposed to avoid these inconveniences by lateral sliding faces for the brake blocks, for which however springs, sleeves and links were required. In this case there exist further for the brake block several friction points, and it is then also not possible to push the brake block with a feeble force away from the rim without a spring. One guide plate was further required for each brake block.

In the device according to the invention exists only one single sliding face of circular shape with regards to the axle centre and arranged above or below the axle on the axle bush, savings in weight, elements and repairs are consequently obtained. The sliding face acts further as inclined plane so that no springs are required for pressing the brake block off the wheel rim.

Two embodiments of the invention are illustrated by way of example in the accompanying drawing in which:—

Fig. 1 shows in side elevation the one embodiment of the invention.

Fig. 2 is a front elevation of Fig. 1 and

Fig. 3 is a top plan view.

Fig. 4 shows in side elevation the second embodiment of the invention.

Fig. 5 is a front elevation and

Fig. 6 a top plan view of Fig. 4.

Fig. 7 shows a constructional detail.

On the rear wall of the axle bush $g$ a sheet metal plate $a$ is arranged. On the brake block $e$ a steering lever $c$ fixed, which has an end $b$ bent off at an angle. $f$ is the steering swivel of the wheel $i$. The sheet metal plate $a$ has an arcuate slot $h$.

The brake block $e$ is suspended in the usual manner on the brake rods $k$, $m$.

If one imagines the applied brack block $e$ guided around the wheel, the lever end $b$ describes an arc around the wheel centre.

At the lifting and lowering of the sufficiently released brake block $e$ this brake block remains always adjusted radial to the wheel $i$. When the brake block is moving farther away from the wheel rim, the block inclines in forward direction in a scarcely perceivable manner. This is however harmless as, when the brake block approaches the wheel rim, this inclination disappears and the radial adjusting exists again. The arcuate slot $h$ must be wide enough to allow some clearance in upward direction for the lever end $b$.

In order to save in weight, the plate $a$ may be made of an aluminum alloy, or for the same flatirons, square irons or irons of other sections may be substituted. Instead of providing in the plate $a$ one slot $h$ for both brake blocks, a separate slot may be provided for each brake block. The steering lever $c$ is preferably made of sheet steel.

The sliding face for the lever end $b$, i. e. the arcuate slot $h$, is preferably arranged at such a height that it is visible above the spring strap commonly used for connecting the car body with the axle frame.

When the brake block and the wheel rim or the bearing brass are worn, the length of the steering lever $c$ has to be regulated with the aid of the screw $d$.

In the form of construction above described the sheet metal plate $a$ is rigidly mounted on the axle bush $g$. According to the second embodiment of the invention the sliding face may however be on the free end of the steering lever $c$. The arc-shaped end $n$ of the lever $c$ rests upon a supporting stud $p$ fixed on the spring strap $o$. In this case this end forms the sliding face inversely as in the first form of construction so that this arc-shaped end is approximately parallel to the plate.

The pin $p$ may be fixed by means of screws so that it can be easily interchanged, or it may be cast on or welded on. The stud $p$ is preferably fixed on the upper end of the spring strap $o$ by means of screws so that very easy interchanging is possible, and the friction point between the steering lever $c$ and the stud $p$ remains permanently visible. If the stud $p$ is on the upper end of the spring strap $o$ the radius of the sliding surface resting on said stud is so great that the moving away of the brake block from the wheel rim causes only a quite imperceptible inclination of the brake block, which is of no practical consideration. The stud *p* might be bent upwards at its free end to prevent slipping off of the steering lever, whereby a double security is obtained, as the end of the stud *p* extends into the cavity of the wheel, whereby slipping off of the steering lever is also prevented. One of the two steering levers of one wheel must be set off more than the other in order that the free ends of the levers be situated in different planes.

Fig. 7 shows a special manner of fixing the steering lever on the brake block. When three screws are used for fixing the lever, the middle screw hole in the steering lever *c* is of accurately the diameter of the screw, the upper and lower holes being oval so that, the nuts having been loosened, the steering lever *c* can be turned to and fro around the middle screw. When only two screws are used, the screw hole of the steering lever situated approximately at the middle of the brake black is made so that it accurately fits the screw diameter, the other hole being oval.

The nuts have elastic washers in order that the steering lever might adjust itself. The screw holes in the brake blocks *e* for the fixation of the steering lever *d* must have accurately the same diameter as the screws. The nuts are locked by splints.

We claim:—

1. A device for the radial adjusting of brake blocks on vehicles running on rails, comprising a sliding face concentric to the axle centre mounted above the axle on the axle bush.

2. A device as specified in claim 1, comprising a plate fixed on the rear wall of the axle bush projecting from said bush in vertical direction and having an arcuate slot.

3. A device as specified in claim 1, comprising a plate fixed on the rear wall of the axle bush projecting from said bush in vertical direction and having an arcuate slot, a steering lever removably fixed on the brake block having a bent end engaging with said arcuate slot, and a regulating screw for adapting the length of said lever to the wear of said brake block and of the wheel rim.

4. A device as specified in claim 1, comprising in combination with the axle bush and the brake block, a steering lever for said brake block removably fixed on the same the end of said lever being curved arc-shaped and forming a sliding face the centre of which coincides with the centre of the wheel.

5. A device as specified in claim 1, comprising in combination with the axle bush and the brake block, a steering lever for said brake block removably fixed on the same the end of said lever being curved arc-shaped and forming a sliding face the centre of which coincides with the centre of the wheel, and a supporting pin fixed on the axle bush adapted to support the arc-shaped end of said lever.

6. A device as specified in claim 1, comprising in combination with the axle bush and the brake block, a steering lever for said brake block removably fixed on the same the end of said lever being curved arc-shaped and forming a sliding face the centre of which coincides with the centre of the wheel, and a supporting pin fixed on the spring strap adapted to support the arc-shaped end of said lever.

7. A device as specified in claim 1, comprising in combination with the brake block and the axle bush, a steering lever having several screw holes one of said screw holes having a true diameter of the screw the other screw holes being oval, and several screws for removably fixing said steering lever on said brake block and screwed through said screw holes so that said steering lever can be adjusted in accordance with the wear of the brake block and of the wheel rim.

In testimony whereof we affix our signatures.

WILHELM LEGGEMANN.
WILHELM MÜLLER.